Aug. 3, 1965     S. PORTER, JR     3,198,654
COATING SYSTEM
Filed Dec. 21, 1961
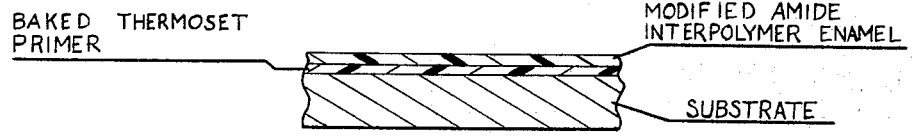
BAKED THERMOSET PRIMER
THERMOPLASTIC METHACRYLATE POLYMER – ALDEHYDE MODIFIED AMIDE INTERPOLYMER ENAMEL
SUBSTRATE
INVENTOR.
SAMUEL PORTER JR
BY
Oscar L. Spencer
ATTORNEY United States Patent Office 3,198,654
Patented Aug. 3, 1965

3,198,654
COATING SYSTEM
Samuel Porter, Jr., Tarentum, Pa., assignor to Pittsburgh Plate Glass Company, Pittsburgh, Pa., a corporation of Pennsylvania
Filed Dec. 21, 1961, Ser. No. 161,186
10 Claims. (Cl. 117—75)

This invention relates to a coating system for automotive finishes and is particularly concerned with an undercoat having a superimposed top coat comprising a blend of a thermoplastic acrylic resin and a thermosetting aldehyde-modified interpolymer of an unsaturated carboxylic acid amide and at least one other ethylenically unsaturated monomer.

Further, the invention relates to an article of manufacture comprising a metal surface having the said coating system superimposed thereon.

Methyl methacrylate polymers have many desirable properties which render them quite useful in finishes, particularly as top coats in automotive finishes. For example, they impart excellent humidity resistance, excellent outdoor durability, provide excellent polishability after baking and also provide good lacquer adhesion for repair materials.

Many efforts have been made to obtain an enamel type finish having the useful properties of the methyl methacrylate lacquers in addition to the characteristic properties of baking enamels. Automotive enamel top coats are generally characterized as having good to excellent adhesion to baking primers, high initial gloss subsequent to baking, good to excellent impact resistance and the like. Moreover, enamel compositions ordinarily have the advantage of being applied at much higher solids than lacquers.

Among the many compositions which have been tested in an attempt to combine lacquer and enamel characteristics in a single coating composition have been the thermosetting blends of carboxylic acid-containing methyl methacrylate homopolymers and copolymers with amino-formaldehyde resins, particularly melamine formaldehyde resins. Finish coats prepared using these resinous components as the vehicle have some of the good features of the polymers of methyl methacrylate. However, they have manifested certain inherent drawbacks such as poor impact resistance and absence of adhesion to air-drying lacquers, thereby preventing easy repair. Moreover, they have poor chip resistance and flexibility.

It has now been discovered that coatings prepared from blends of thermoplastic alkyl methacrylate polymers and aldehyde-modified carboxylic acid amide interpolymers have the desirable properties which are characteristic of both methacrylate lacquers and standard baking enamels.

Finish coats prepared using the said blends as the resinous vehicles have in addition to the characteristic properties of a standard baking enamel the desirable properties of the alkyl methacrylate polymers, namely, excellent humidity resistance, excellent outdoor durability, excellent polishability after baking, and in contrast to the blends of the acid-containing homopolymers and copolymers with amino-formaldehyde resins they have excellent lacquer adhesion for repair purposes.

In addition to maintaining all of the desirable properties of each of the resinous components, the compositions of this invention are better in impact resistance, chip resistance and initial gloss than coating compositions prepared utilizing either a thermosetting resin or a thermoplastic resin alone as the sole resinous component.

The invention is characterized as a coating system comprising a layer of an undercoat of a thermosetting resin, said primer having superimposed thereon a coating of a composition comprising (1) a thermoplastic acrylic interpolymer comprising in polymerized form a member selected from the group consisting of methyl methacrylate and ethyl methacrylate and (2) a thermosetting resinous interpolymer of an unsaturated carboxylic acid amide and at least one other monomer containing a $>C=CH_2$ group, said interpolymer containing from about 2 to 50 percent by weight of said amide in polymerized form, said interpolymer being characterized by having at least one hydrogen atom of an amido nitrogen replaced by the structure:

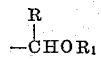

wherein R is a member selected from the group consisting of hydrogen and lower alkyl and $R_1$ is a member selected from the group consisting of hydrogen, alkyl and alkoxyethyl. The composition may comprise about 40 to 90 percent by weight of the resinous composition and preferably comprises about 50 to 70 percent of the resinous composition. The thermosetting component, that is, the aldehyde-modified carboxylic acid amide interpolymer, may comprise from 10 percent to 60 percent by weight of the said resinous compositions.

Reference is made to the accompanying drawing wherein the coating system of the instant invention is depicted.

The thermoplastic acrylic component is essentially comprised of a polymer of methyl or ethyl methacrylate wherein the methyl methacrylate or ethyl methacrylate constitutes from 50 to 100 percent and preferably at least 70 percent by weight of the acrylic component. The remainder of the polymer of methyl methacrylate may be comprised of at least one other hardening monomer such as acrylonitrile, methacrylonitrile, styrene and the like, a plasticizing monomer such as the esters of acrylic acid in which the esterifying group has from 1 to 18 carbon atoms. Examples of esterifying alcohols include methyl alcohol, ethyl alcohol, propyl alcohol, butyl alcohol, amyl alcohol, hexyl alcohol, heptyl alcohol, 2-ethylhexyl alcohol, n-octyl alcohol, dodecyl alcohol, hexadecyl alcohol, octadecyl alcohol and the like; the esters of methacrylic acid having from 3 to 18 carbon atoms and preferably at least 8 carbon atoms such as octyl alcohol, lauryl alcohol, decyl octyl alcohol and the like. The inclusion of from 2 to 15 percent and preferably not more than 6 percent of an unsaturated carboxylic acid such as acrylic acid, methacrylic acid and itaconic acid is also desirable where there exists a slight incompatibility between the thermoplastic component and the thermosetting component of the resinous vehicle of the instant invention.

A copending application, Serial No. 108,292, filed May 8, 1961, discloses a particularly desirable class of methyl methacrylate copolymers which may be used advantageously as the thermoplastic acrylic component of the instant invention. The polymers disclosed therein essentially comprise from about 70 to 90 percent methyl methacrylate and from about 10 percent to 30 percent by weight of an alcohol ester of methacrylate acid containing at least 8 carbon atoms. The preferred comonomer with the methyl methacrylate is lauryl methacrylate which is preferably employed in amounts of about 10 percent to 30 percent by weight of total monomer constituents. Such polymers have a molecular weight of from about 87,000 to 150,000. The relative viscosity of these methyl methacrylate copolymers ranges from about 1.150 to about 1.260 and preferably from about 1.180 to about 1.250. Relative viscosity (also known as viscosity ratio) is defined as follows:

$$N_r = \frac{\text{efflux time of polymer solution in seconds}}{\text{efflux time of solvent solution in seconds}}$$

The efflux times are measured in accordance with the procedure of ASTM D–445–46T (Method B) using as the oil of said procedure (1) a solution of 0.25 gram of dichloride, and (2) a sample of the ethylene dichloride utilized in making the solution. The determinations are run at 25° C. in an Ostwald Viscometer, Series 50.

The above relative viscosity range of 1.150 to 1.260 corresponds to a molecular weight in the range of about 87,000 to 150,000. The equation utilized in determining molecular weight is as follows, wherein the constants for polymethyl methacrylate are employed:

$$M.W. = 1.47 \times 10^6 (N_r - 1 - \ln N_r)^{0.65}$$

where $$N_r = \frac{\text{efflux time of polymer solution in seconds}}{\text{efflux time of solvent solution in seconds}}$$

Copending application Serial No. 584,474, filed May 14, 1956, also discloses copolymers of methyl methacrylate which may be used with the instant invention.

The thermosetting aldehyde-modified unsaturated carboxylic acid amide interpolymers, particularly the interpolymers prepared using acrylamide, include those interpolymers prepared from a large variety of ethylenically unsaturated monomers. These interpolymers range from soft, flexible materials to very had solids depending upon the presence of monomers utilized in preparing the acrylamide interpolymer which in turn is reacted with formaldehyde in the presence of an alkanol, preferably having at least 4 carbon atoms and as high as 18 carbon atoms. Examples of monomers which impart hardness to these interpolymers are styrene, vinyl toluene, methyl methacrylate, acrylonitrile, methacrylonitrile and the like; while the monomers which impart plasticizing or softening qualities include ethyl acrylate, 2-ethylhexyl acrylate, dibutyl itaconate and the like. Moreover, a small amount (1 percent to about 30 percent and preferably 2 to about 10 percent) of an unsaturated carboxylic acid may be interpolymerized with the said interpolymers.

A preferred class of thermosetting resins which may be used in preparing the top coats of the instant invention comprises from about 10 percent to 15 percent acrylamide or methacrylamide and from about 35 percent to about 50 percent methyl or ethyl methacrylate, 2 to 10 percent of an unsaturated carboxylic acid, with the remainder being another monomer such as styrene, vinyl toluene or acrylonitrile. For a more detailed disclosure of the said aldehyde-modified acrylamide interpolymers, reference is made to U.S. Patent 2,978,437 and application Serial No. 749,583, filed July 21, 1958, now U.S. Patent No. 3,037,963.

In addition to the internal plasticizing action of the above-mentioned monomers, it is at times advantageous to incorporate small amounts (up to 20 percent by weight of the resinous composition) of an external plasticizer. Examples of plasticizers which may be used include the alkyl phthalates, such as dibutyl phthalate, the aryl phthalates such as dibenzyl phthalate, benzyl butyl phthalate, triphenyl phosphate, 2-ethylhexyl benzyl phthalate and dicyclohexyl phthalate. Other well-known plasticizers for polymers of methyl and ethyl methacrylates which may be employed include diallyl phthalate, butyl cyclohexyl phthalate, mixed benzoic acid and fatty oil acid esters of pentaerythritol, poly (propylene adipate) dibenzoate, diethylene glycol dibenzoate, tetrabutylthiodisuccinate, butyl phthalyl butyl glycolate, acetyl tributyl citrate, dibenzyl sebacate, tricresyl phosphate, toluene ethyl sulfonamide, the di-2-ethylhexyl ester of hexamethylene diphthalate, and di(methylcyclohexyl)phthalate.

Various solvents may be employed, such as toluene, xylenes, acetone, methyl ethyl ketone, methyl isobutyl ketone, methyl isopropyl ketone, amyl alcohol, 2-ethoxyethyl acetate, ethyl acetate, butyl lactate, amyl acetate, methyl acetate, denatured ethyl alcohol, isopropanol, diacetone alcohol, cyclohexanol, ethylene dichloride, diisobutyl ketone, cyclohexanone, 2-butoxyethanol, furfuryl, petroleum naphtha, boiling in the range of about 87° C. to about 145° C., cyclohexane, hexane, aromatic hydrocarbon mixtures, such as "Solvesso 150," and also various aliphatic, naphthenic and aromatic naphthas. While certain of these solvents cannot be used alone because of lack of solvent power for the copolymers, they can be used in a mixture with others. Obviously, mixtures of such solvents are generally quite useful.

The finish coats of the instant invention are preferably composed solely of the thermoplastic acrylic component and the thermosetting aldehyde-modified acrylic interpolymer as the resinous components. Minor amounts, however, of other resinous film-forming materials may be added either as a filler material or as an agent for acquiring certain specific properties or effects. Excellent compositions are obtained using about 5 percent to about 10 percent melamine-formaldehyde resin, about 5 percent to about 10 percent of an alkyd resin, or 5 percent to 10 percent of both.

A preferred method of incorporating these added film-forming materials is first to form a compatible blend with the additional aldehyde-modified acrylamide interpolymer and subsequently add the thermoplastic acrylic component. For a more detailed and complete disclosure of the acrylamide interpolymer blends with additional materials, reference is made to U.S. Patents 2,870,116, 2,870,117, 2,940,943, 2,940,944, and 2,940,945; and application Serial No. 677,778, filed August 12, 1957, now U.S. Patent No. 3,050,495.

As previously mentioned, many of the resinous blends of the instant invention may be advantageously employed as finish coats in automotive finishes. These blends have excellent adhesion to all of the well-known baking primers, the majority of which have only poor adhesion at best to the thermoplastic polymethacrylate top coats. These baking primers include those composed of drying oil-modified alkyds, rosin-modified alkyds, mixed or co-reacted alkyds and amino-formaldehyde resins, mixed or co-reacted alkyds and epoxy resins, mixed or interreacted alkyd, amino-formaldehyde, epoxy resins, mixed or interreacted esterified epoxy resins with amino-formaldehyde resins and/or alkyds.

While, for certain purposes, a clear lacquer may be employed, it is quite general to include pigments in an amount up to 100 percent by weight of the polymer in the lacquer finishing compositions. Examples of suitable pigments include titanium dioxide, carbon black, iron blues, phthalocyanine blues and greens; metal oxides, hydroxides, sulfides, sulfates, silicates and chromates; organic maroons, aluminum flake, bronze powders, pearl essence, and various fillers or extenders such as talc, barytes, china clay and diatomaceous earth.

It is advantageous to pre-grind the pigments which are to be used in the finish coat formulation with a small amount of the thermosetting aldehyde-modified acrylamide interpolymer prior to the incorporation of the thermoplastic acrylic component. This procedure is particularly advantageous when certain pigments are difficult to disperse in the thermoplastic acrylic component. Other grinding and dispersion methods may be used. Examples of suitable equipment or grinding devices include ball, pebble, Buhrstone and colloid mills, kneader-mixers or Bamburg or Warner Pfliderer.

Enamel top coat compositions prepared according to the present invention may be applied at a solids content up to 35 percent and preferably between about 22 percent to about 28 percent, depending upon the relative proportion of the thermoplastic acrylic component. After spraying the finish coats on a metal surface coated with a baked primer which has been cured for 30 minutes at 300° F. to 350° F. the finish coat is then baked for 15 to 30 minutes at 200° F. to 275° F.

The following examples are given by way of illustration and not by way of limitation.

EXAMPLES A–H

These examples illustrate the preparation of particular amide interpolymers, the pertinent data relating thereto being set forth in the accompanying table. They are prepared simply by refluxing the amide and the other comonomers in the presence of one of the aforementioned catalysts such as cumene hydroperoxide and a chain transfer agent in an alcohol solution or in an alcoholic hydrocarbon solvent mixture (about 50 percent to 100 percent based on the weight of the reactant monomers). After about 60 percent to 70 percent of the monomers have been converted, formaldehyde in the form of paraformaldehyde or a butyl Formcel (40 percent butyl alcohol solution of formaldehyde) is added together with a small amount of maleic anhydride. In order to obtain maximum conversion of the reactive monomers it is usually necessary to add a catalyst (cumene hydroperoxide) during the course of the polymerization, the reason being that the said catalyst is used up during the reaction. Amounts of about ½ percent to 1 percent based on the monomer solids should be added after each 1- to 2-hour interval. As previously mentioned, it has proved advantageous to blend minor amounts (5 to 10 percent by weight) of an epoxy resin with the said unsaturated carboxylic acid amide interpolymer. This may be done by hot or cold blending. The reaction mass is then refluxed with an azeotropic distillation for a substantial length of time (about 3 hours) to remove the water of reaction.

EXAMPLES I–N

These examples illustrating particular methyl methacrylate interpolymers are prepared by refluxing the monomer reactants in a suitable hydrocarbon solvent such as benzene or toluene in the presence of a free radical initiating catalyst such as benzoyl peroxide until maximum conversion is obtained. In order to effect maximum conversion, small increments of catalyst (about 1 to 2 parts) may be added in a hydrocarbon solution during the reaction. It has proved advantageous to add the said catalyst at intervals ranging from about every 1½ hours to 2 hours.

Alternatively the acrylic polymers may be prepared by suspension or bead polymerization techniques. This technique includes forming two solutions; one of the reactant monomers, catalyst and chain stopper, and one of water, protective colloid and buffer. The two solutions were then mixed in a vessel equipped with thermometer, condenser and stirrer. Agitation was maintained for the entire reaction time, during which the temperature was maintained for 1½ hours at 75° C. to 78° C. The pertinent data are set forth in the following table.

TABLE II

[Parts by weight]

| Example | I* | J* | K | L | M | N* |
|---|---|---|---|---|---|---|
| Materials: | | | | | | |
| Methyl methacrylate | 90 | 1,080 | 952 | 12.8 | 12.8 | 225.000 |
| Lauryl methacrylate | 10 | 120 | 420 | | 6.0 | 25.000 |
| Dibutyl itaconate | | | | 6.0 | | |
| Tertiary dodecyl mercaptan | 0.75 | 15 | | | | 1.880 |
| Benzoyl peroxide | 1.0 | 12 | 10.5 | 0.3 | 0.4 | 2.920 |
| Cyanamer 370 (15% water solution of sodium polyacrylate) | 2.0 | 27.6 | | | | |
| Disodium phosphate | 0.1 | 15.1 | | | | 3.160 |
| Monosodium phosphate | 1.7 | 0.94 | | | | 0.196 |
| Water | 290.0 | 2,760.0 | | | | 575.000 |
| Methacrylic acid | | | 28.0 | 1.2 | 1.2 | |
| Toluene | | | 2,100.0 | 28.0 | 15.0 | |
| Acetone | | | 420.0 | 12.0 | | |
| Cellosolve acetate | | | 420.0 | | | |
| Butanol | | | | 2.0 | 15.0 | |
| Kofilm #50 acetylated starch | | | | | | 2.500 |

*Suspension polymerization technique used.

EXAMPLE O

A pigment paste was prepared as follows:

Parts by weight
Titanium dioxide _____ 460
Product of Example I _____ 139

These two ingredients were placed in a Baker Perkins mill and ground for 20 minutes. Two hundred and fifty (250) parts of the product of Example I, 56 parts of xylene and 6 parts of butyl Cellosolve were then added as letdown and the mixture was ground until homogeneity was obtained.

TABLE I

[Parts by weight]

| Example | A | B | C | D | E | F | G | H |
|---|---|---|---|---|---|---|---|---|
| Materials: | | | | | | | | |
| Acrylamide | 150.0 | 225.0 | 30.0 | 3.0 | 45.0 | 30.0 | 45.0 | 600 |
| Styrene | 375.0 | 577.5 | 130.5 | 7.7 | 247.5 | 77.0 | 247.5 | 2,610 |
| Ethyl acrylate | 975.0 | 660.0 | 132.0 | | | 88.0 | | |
| Tertiary dodecyl mercaptan | 15.0 | 22.5 | 3.75 | 0.6 | 3.0 | 3.0 | 6.0 | 80 |
| Methyl methacrylate | | | | 8.9 | | | | 2,640 |
| Methacrylic acid | | 37.5 | 7.5 | 0.5 | 7.5 | 5.0 | 7.5 | 150 |
| Cumene hydroperoxide | 45.0 | 37.5 | 9.0 | 0.5 | 9.55 | 6.5 | 10.5 | 180 |
| Butyl Formcel | 318.0 | 477.0 | 63.6 | 6.3 | 95.3 | 63.5 | 95.4 | 1,272 |
| Maleic anhydride | 4.3 | 6.0 | 0.8 | 0.08 | 1.27 | 0.85 | 1.26 | 16 |
| Solvesso 150 (High boiling aromatic solvent, B.P. about 185° C.–200° C.) | 808.5 | | | | | | | |
| Butanol | 750.0 | 750.0 | 75.0 | 10.0 | 150.0 | 100.0 | 150.0 | 1,500 |
| Toluene | | 937.0 | 150.0 | 10.0 | 175.0 | 100.0 | 141.0 | 3,000 |
| Xylene | | | 75.0 | | | | | |

EXAMPLE P

| | Parts by weight |
|---|---|
| Aluminum pigment (Alcoa 222) | 38 |
| Product of Example K (methyl methacrylate, lauryl methacrylate copolymer) | 50 |
| Cellosolve acetate | 12 |

The above ingredients were ground in a pebble mill for about 16 hours.

EXAMPLE Q

A representative baking primer which was used in the following Examples 1 through 10 was made up using the following vehicle composition:

| | Parts by weight |
|---|---|
| Alkyd resin modified with styrene and methyl methacrylate (39% glycerol ester of a 2:1 blend of soya oil and dehydrated castor oil, 37.5% glycerol phthalate and 3.5% excess glycerine and copolymerized with 10% styrene and 10% methyl methacrylate) | 21.5 |
| Epoxy ester (32% fractionated cottonseed acid, iodine value of 132 minimum, 68% Epon 1004, acid No. 7 as 50% solids in xylene) | 62.0 |
| Urea-formaldehyde resin (naphtha tolerance, 10 gms. in 36–40 ml. of naphtha aliphatic hydrocarbon) | 5.5 |
| Epoxy resin (Union Carbide's ERL 2774 or Shell's Epon 834) | 11.0 |

The above components were formulated using suitable pigments, solvents, driers, (e.g. cobalt naphthenate) and suspending agents, adjusted to a spraying viscosity and sprayed on phosphatized steel panels (Bonderite 100). The coated panels were then baked for 30 minutes at 350° F.

EXAMPLE R

A pigment paste was prepared as follows:

| | Parts by weight |
|---|---|
| Aluminum pigment (Alcoa 222) | 600 |
| Product of Example L (methyl methacrylate, dibutyl itaconate copolymer) | 149 |

The above ingredients were intermixed in a standard paint shaker.

| | Parts by weight |
|---|---|
| Product of Example L | 324 |
| Toluene | 89 |
| Cellosolve acetate | 48 |

EXAMPLE 1

| | Parts by weight |
|---|---|
| Pigment paste of Example O ($TiO_2$ pigment in methyl methacrylate, lauryl methacrylate copolymer) | 82 |
| Product of Example J (methyl methacrylate, lauryl methacrylate copolymer) | 163 |
| Product of Example C (interpolymer of acrylamide, styrene, ethyl acrylate and methacrylic acid) | 60 |
| Cellosolve acetate | 84 |
| Toluene | 171 |

The above formulation was adjusted to a suitable spraying viscosity (20 percent total solids) and applied to primed phosphatized steel panels (Bonderite 100). The panels were then baked for 30 minutes at 180° F. The baked films had a gloss of 90.

EXAMPLE 2

| | Parts by weight |
|---|---|
| Pigment paste of Example O ($TiO_2$ pigment in methyl methacrylate, lauryl methacrylate copolymer) | 82 |
| Product of Example I (methyl methacrylate, lauryl methacrylate copolymer) | 134 |
| Product of Example C (interpolymer of acrylamide, styrene, ethyl acrylate and methacrylic acid) | 80 |
| Cellosolve acetate | 65 |
| Toluene | 104 |

The above formulation was adjusted to a suitable viscosity and sprayed on primer phosphatized steel panels (Bonderite 100). The panels were then baked for 30 minutes at 225° F. The baked films had a gloss of 93 and an impact of 80 inch/pounds when measured with a Gardner Variable Impact Tester.

EXAMPLE 3

A pigment paste was prepared by grinding 600 parts of titanium dioxide pigment with 139 parts of the product of Example I in a Baker Perkins mill for 20 minutes. Two hundred and eighty (280) parts more of the product of Example I with 56 parts of toluene and 25 parts of Cellosolve acetate were then added to the mill. The mixture was ground further to effect homogeneity. A lacquer was then prepared from the following formulation:

| | Parts by weight |
|---|---|
| Pigment paste prepared as above | 73 |
| Product of Example N (methyl methacrylate, lauryl methacrylate copolymer) | 139 |
| Product of Example C (interpolymer of acrylamide, styrene, ethyl acrylate and methacrylic acid) | 80 |
| Cellosolve acetate | 40 |

This formulation was then adjusted to a suitable vis-

TABLE III
[Parts by weight]

| Material | 4 | 5 | 6 | 7 | 8 | 9 | 10 |
|---|---|---|---|---|---|---|---|
| Pigment paste as prepared in Example 3 | 73 | 73 | | | | | |
| Pigment paste of Ex. P | | | | 12 | 12 | 12 | 6 |
| Product of Ex. H (acrylamide, styrene, methyl methacrylate, methacrylic acid polymer) | | | | 80 | 140 | 100 | 40 |
| Product of Ex. C (acrylamide, styrene, ethyl acrylate, methacrylic acid polymer) | 80 | 80 | 90 | | | | |
| Product of Ex. N (methyl methacrylate, lauryl methacrylate copolymer) | 139 | 119 | | | | | |
| Product of Ex. L (methyl methacrylate, dibutyl itaconate, methacrylic acid copolymer) | | | 72 | | | | |
| Dioctyl phthalate | | 5 | | | | 10 | |
| Melamine-formaldehyde resin | | | 40 | | | | 5 |
| Toluene | 20 | 16 | 25 | 130 | 109 | 144 | |
| Cellosolve acetate | 20 | 39 | 25 | 44 | 38 | 50 | |
| Pigment paste of Ex. R | | | 80 | | | | |
| Product of Ex. K (methyl methacrylate, lauryl methacrylate, methacrylic acid interpolymer) | | | | 144 | 69 | 94 | 55 | cosity and sprayed on primer phosphatized steel panels (Bonderite 100). Some of the panels were then baked for 30 minutes at 180° F. and some of the panels were baked for 30 minutes at 250° F. The baked films had excellent humidity resistance after 500 hours of exposure to an environment maintained at 100° F. and 100 percent humidity. The films also had a gloss of 91 at 60°.

The compositions set forth in Table III were applied and tested in the manner outlined in Example 3. A portion of the coated panels utilizing each composition was baked at 225° F. for 30 minutes and a portion was baked at 250° F. for 30 minutes. The panels coated with the compositions of Examples 4, 5, and 6 which were baked at 250° F. maintained a gloss of about 100 after six months of outdoor exposure in Florida as measured by a Detroit Club Gloss Meter.

Although specific examples have been set forth hereinabove, it is not intended that the invention be limited solely thereto, but to include all of the variations and modifications falling within the scope of the appended claims.

I claim:

1. A coated article having thereon a coating system comprising a layer of a baked primer of a thermosetting resin, said primer having superimposed thereon a coating of a composition comprising a thermoplastic acrylic interpolymer comprising in polymerized form a member selected from the group consisting of methyl methacrylate and ethyl methacrylate and a thermosetting resinous interpolymer of an unsaturated carboxylic acid amide and at least one other monomer containing a $>C=CH_2$ group, said thermosetting interpolymer containing from about 2 to 50 percent by weight of said amide in polymerized form based on the total weight of said thermosetting interpolymer and being characterized by having at least one hydrogen atom of an amido nitrogen replaced by the structure

wherein R is a member selected from the group consisting of hydrogen and lower alkyl and $R_1$ is a member selected from the group consisting of hydrogen, alkyl and alkoxyethyl.

2. As an article of manufacture, a metal base, a baked primer coating on the surface of the metal, the binder of said coating being formed from a thermosetting resin, said primer coating having superimposed thereon a coating of a composition comprising from about 40 to about 90 percent by weight of a thermoplastic acrylic interpolymer comprising in polymerized form a member selected from the group consisting of methyl methacrylate and ethyl methacrylate and from about 10 to about 60 percent by weight of a thermosetting resinous interpolymer of an unsaturated carboxylic acid amide and at least one other monomer containing a $>C=CH_2$ group, said thermosetting interpolymer containing from 2 to 50 percent by weight of said amide in polymerized form based on the total weight of said thermosetting interpolymer and being characterized by having at least one hydrogen atom of an amido nitrogen replaced by the structure

wherein R is a member selected from the group consisting of hydrogen and lower alkyl and $R_1$ is a member selected from the group consisting of hydrogen, lower alkyl and alkoxyethyl.

3. The article of claim 2 wherein the thermoplastic acrylic interpolymer is an interpolymer of methyl methacrylate, lauryl methacrylate and methacrylic acid and the thermosetting interpolymer is an interpolymer of acrylamide, methyl methacrylate, styrene and methacrylic acid.

4. The article of claim 3 wherein there is present in the superimposed coating composition a melamine-formaldehyde resin.

5. The article of claim 2 wherein the thermoplastic interpolymer is an interpolymer of methyl methacrylate, dibutyl itaconate and methacrylic acid and the thermosetting interpolymer is an interpolymer of acrylamide, methyl methacrylate, styrene and methacrylic acid.

6. The article of claim 2 wherein the thermoplastic interpolymer is an interpolymer of methyl methacrylate and lauryl methacrylate and the thermosetting interpolymer is an interpolymer of acrylamide, styrene and ethyl acrylate.

7. As an article of manufacture, a metal base, a baked primer comprised of an alkyd resin, an epoxy resin, an epoxy ester resin and a urea-formaldehyde resin from the surface of the metal, said primer coating having superimposed thereon a coating of a composition comprising a blend of a thermoplastic acrylic interpolymer of methyl methacrylate, lauryl methacrylate, methacrylic acid and a thermosetting aldehyde-modified interpolymer of acrylamide, methyl methacrylate, styrene and methacrylic acid, said thermosetting interpolymer having amido hydrogen atoms replaced by the structure $—CH_2OR_1$, where $R_1$ is a member selected from the group consisting of hydrogen, lower alkyl and alkoxyethyl.

8. A coated article comprising a metal base, an adherent layer of a baked thermosetting resin, and a superimposed coating of a composition comprising (1) from about 40 to about 90 percent by weight of a thermoplastic acrylic interpolymer comprising in polymerized form a member selected from the group consisting of methyl methacrylate and ethyl methacrylate, and (2) from about 10 to about 60 percent by weight of a thermosetting resinous interpolymer of an unsaturated carboxylic acid amide selected from the class consisting of acrylamide and methacrylamide and at least one other copolymerizable monomer having a $>C=CH_2$ group, said thermosetting interpolymer containing from about 2 to about 50 percent by weight of said amide in polymerized form based on the total weight of said thermosetting interpolymer and being characterized by having amido groups with at least one hydrogen atom replaced by the structure $—CH_2OR_1$, where $R_1$ is lower alkyl.

9. The article of claim 8 in which said thermoplastic interpolymer comprises methyl methacrylate and said amide in said thermosetting interpolymer is acrylamide.

10. The article of claim 9 in which the groups represented by $R_1$ are butyl.

References Cited by the Examiner

UNITED STATES PATENTS

| | | | |
|---|---|---|---|
| 2,870,116 | 1/59 | Vogel et al. | 117—132 |
| 2,870,117 | 1/59 | Vogel et al. | 117—132 |
| 2,873,210 | 2/59 | Barret et al. | 117—75 |
| 2,940,872 | 6/60 | Gusman et al. | 117—75 |
| 2,940,943 | 6/60 | Christenson et al. | 117—132 |
| 2,940,944 | 6/60 | Christenson et al. | 117—132 |
| 2,940,945 | 6/60 | Christenson et al. | 117—132 |
| 2,955,055 | 10/60 | Souder et al. | 117—75 |
| 2,978,437 | 4/61 | Christenson | 117—132 |
| 3,011,993 | 12/61 | Kapalko et al. | 117—161 |
| 3,037,963 | 6/62 | Christenson | 117—132 |
| 3,050,495 | 8/62 | Christenson | 117—132 |

FOREIGN PATENTS 839,480   6/60   Great Britain.

RICHARD D. NEVIUS, *Primary Examiner.*